US008537821B2

(12) United States Patent
Laliberte

(10) Patent No.: US 8,537,821 B2
(45) Date of Patent: *Sep. 17, 2013

(54) METHODS, SYSTEMS, AND PRODUCTS FOR EMERGENCY COMMUNICATIONS

(75) Inventor: Donald R. Laliberte, Lawrenceville, GA (US)

(73) Assignee: Shoretel, Inc., Sunnyvale, CA (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/500,668

(22) Filed: Jul. 10, 2009

(65) Prior Publication Data

US 2009/0274145 A1 Nov. 5, 2009

Related U.S. Application Data

(63) Continuation of application No. 10/855,140, filed on May 27, 2004, now Pat. No. 7,580,405.

(51) Int. Cl.
*H04L 12/28* (2006.01)
*H04L 12/56* (2011.01)

(52) U.S. Cl.
USPC ............ 370/392; 370/255; 370/254; 370/389

(58) Field of Classification Search
USPC ................. 370/389, 392, 255, 254, 252, 352
See application file for complete search history.

(56) References Cited

U.S. PATENT DOCUMENTS

| | | |
|---|---|---|
| 4,839,917 A | 6/1989 | Oliver |
| 4,935,951 A | 6/1990 | Robinson et al. |
| 4,993,058 A | 2/1991 | McMinn et al. |
| 5,012,507 A | 4/1991 | Leighton et al. |
| 5,077,788 A | 12/1991 | Cook et al. |
| 5,109,399 A | 4/1992 | Thompson |
| 5,161,180 A | 11/1992 | Chavous |
| 5,235,630 A | 8/1993 | Moody et al. |
| RE34,677 E | 7/1994 | Ray et al. |
| 5,339,351 A | 8/1994 | Hoskinson et al. |
| 5,343,509 A | 8/1994 | Dounies |
| 5,347,567 A | 9/1994 | Moody et al. |
| 5,347,568 A | 9/1994 | Moody et al. |
| 5,511,111 A | 4/1996 | Serbetcioglu et al. |
| 5,526,406 A | 6/1996 | Luneau |
| 5,621,379 A | 4/1997 | Collins |
| 5,673,304 A | 9/1997 | Connor et al. |
| 5,724,412 A | 3/1998 | Srinivasan |
| 5,796,806 A | 8/1998 | Birckbichler |
| 5,805,587 A | 9/1998 | Norris et al. |
| 5,835,907 A | 11/1998 | Newman |
| 5,883,942 A | 3/1999 | Lim et al. |
| 5,940,474 A | 8/1999 | Ruus |

(Continued)

OTHER PUBLICATIONS

Author Not Available, Bellsouth E911 Service Interfaces To Customer Premises Equipment at a Public Safety Answering Point, Bellsouth Technical Reference, Apr., 2001, Issue 6, TR73528;.

(Continued)

*Primary Examiner* — John Pezzlo
(74) *Attorney, Agent, or Firm* — Silicon Valley Patent Group LLP; Omkar Suryadevara

(57) ABSTRACT

Methods, systems, and products are disclosed for processing emergency communications. A database of addresses is queried to determine if a communications address is an emergency communications address. When the communications address is the emergency communications address, then a location coordinate is retrieved and mapped to a location of an emergency services provider.

63 Claims, 8 Drawing Sheets

(56) References Cited

U.S. PATENT DOCUMENTS

| | | | |
|---|---|---|---|
| 5,940,475 A | 8/1999 | Hansen | |
| 6,009,148 A | 12/1999 | Reeves | |
| 6,011,473 A | 1/2000 | Klein | |
| 6,076,117 A | 6/2000 | Billings | |
| 6,104,784 A | 8/2000 | Robbins | |
| 6,104,800 A | 8/2000 | Benson | |
| 6,144,644 A | 11/2000 | Bajzath et al. | |
| 6,151,385 A | 11/2000 | Reich et al. | |
| 6,208,718 B1 | 3/2001 | Rosenthal | |
| 6,208,726 B1 | 3/2001 | Bansal et al. | |
| 6,219,413 B1 | 4/2001 | Burg | |
| 6,259,692 B1 | 7/2001 | Shtivelman et al. | |
| 6,266,397 B1 | 7/2001 | Stoner | |
| 6,307,920 B1 | 10/2001 | Thomson et al. | |
| 6,310,946 B1 | 10/2001 | Bauer et al. | |
| 6,343,115 B1 | 1/2002 | Foladare et al. | |
| 6,347,136 B1 | 2/2002 | Horan | |
| 6,356,756 B1 | 3/2002 | Koster | |
| 6,363,065 B1 | 3/2002 | Thornton et al. | |
| 6,363,138 B1 | 3/2002 | Aprile | |
| 6,434,126 B1 | 8/2002 | Park | |
| 6,476,763 B2 | 11/2002 | Allen, Jr. | |
| 6,480,581 B1 | 11/2002 | Wu et al. | |
| 6,510,325 B1 | 1/2003 | Mack, II et al. | |
| 6,529,500 B1 | 3/2003 | Pandharipande | |
| 6,603,977 B1 | 8/2003 | Walsh et al. | |
| 6,608,886 B1 | 8/2003 | Contractor | |
| 6,614,781 B1 | 9/2003 | Elliott et al. | |
| 6,622,016 B1 | 9/2003 | Sladek et al. | |
| 6,624,754 B1 | 9/2003 | Hoffman et al. | |
| 6,661,785 B1 | 12/2003 | Zhang et al. | |
| 6,665,293 B2 | 12/2003 | Thornton et al. | |
| 6,665,388 B2 | 12/2003 | Bedingfield | |
| 6,665,611 B1 | 12/2003 | Oran et al. | |
| 6,674,745 B1 | 1/2004 | Schuster | |
| 6,678,357 B2 | 1/2004 | Stumer et al. | |
| 6,680,998 B1 | 1/2004 | Bell et al. | |
| 6,703,930 B2 | 3/2004 | Skinner | |
| 6,704,305 B2 | 3/2004 | Emerson, III | |
| 6,718,021 B2 | 4/2004 | Crockett et al. | |
| 6,763,020 B1 | 7/2004 | Hon | |
| 6,771,742 B2 | 8/2004 | McCalmont et al. | |
| 6,792,081 B1 | 9/2004 | Contractor | |
| 6,804,338 B1 | 10/2004 | Chen | |
| 6,842,448 B1 | 1/2005 | Norris et al. | |
| 6,868,074 B1 | 3/2005 | Hanson | |
| 6,912,399 B2 | 6/2005 | Zirul et al. | |
| 6,940,950 B2 | 9/2005 | Dickinson et al. | |
| 7,092,380 B1 | 8/2006 | Chen et al. | |
| 7,164,921 B2 | 1/2007 | Owens et al. | |
| 7,251,470 B2 | 7/2007 | Faucher et al. | |
| 7,257,387 B2 | 8/2007 | Laliberte | |
| 7,356,129 B1 | 4/2008 | Moody | |
| 7,391,761 B1 | 6/2008 | Ruckart | |
| 7,580,405 B2 | 8/2009 | Laliberte | |
| 7,783,013 B2 | 8/2010 | Laliberte | |
| 2001/0005372 A1 | 6/2001 | Cave et al. | |
| 2001/0043684 A1 | 11/2001 | Guedalia et al. | |
| 2002/0059374 A1 | 5/2002 | Nuestro | |
| 2002/0065063 A1 | 5/2002 | Uhlik et al. | |
| 2002/0065828 A1 | 5/2002 | Goodspeed | |
| 2002/0072348 A1 | 6/2002 | Wheeler et al. | |
| 2002/0160745 A1 | 10/2002 | Wang | |
| 2002/0163906 A1 | 11/2002 | Diachina et al. | |
| 2003/0190017 A1 | 10/2003 | Zellner et al. | |
| 2003/0211839 A1 | 11/2003 | Baum et al. | |
| 2003/0216148 A1 | 11/2003 | Henderson | |
| 2004/0037403 A1 | 2/2004 | Koch | |
| 2004/0057425 A1 | 3/2004 | Brouwer et al. | |
| 2004/0073597 A1* | 4/2004 | Caveney et al. | 709/200 |
| 2004/0101123 A1 | 5/2004 | Garcia | |
| 2004/0105529 A1* | 6/2004 | Salvucci et al. | 379/45 |
| 2004/0121782 A1 | 6/2004 | Tester | |
| 2004/0140928 A1 | 7/2004 | Cleghorn | |
| 2004/0174880 A1 | 9/2004 | White et al. | |
| 2004/0192252 A1 | 9/2004 | Aerrabotu et al. | |
| 2005/0047574 A1 | 3/2005 | Reid | |
| 2005/0063519 A1 | 3/2005 | James | |
| 2005/0070315 A1 | 3/2005 | Rai et al. | |
| 2005/0083911 A1 | 4/2005 | Grabelsky et al. | |
| 2005/0151642 A1 | 7/2005 | Tupler et al. | |
| 2005/0169438 A1* | 8/2005 | Binning | 379/45 |
| 2005/0175166 A1 | 8/2005 | Welenson et al. | |
| 2005/0190750 A1 | 9/2005 | Kafka et al. | |
| 2005/0190892 A1* | 9/2005 | Dawson et al. | 379/37 |
| 2005/0232243 A1 | 10/2005 | Adamczyk | |
| 2005/0250468 A1 | 11/2005 | Lu | |
| 2005/0258958 A1* | 11/2005 | Lai | 340/539.15 |
| 2006/0115057 A1 | 6/2006 | Laliberte | |
| 2006/0188073 A1* | 8/2006 | Wright | 379/45 |
| 2007/0008961 A1 | 1/2007 | Martino | |
| 2007/0147348 A1 | 6/2007 | Lu | |
| 2007/0259645 A1 | 11/2007 | Laliberte | |

OTHER PUBLICATIONS

Author Not Available, "VoIP Patent Applied For", Techweb News, believed to be prior to May 14, 2010, pp. 1-2;.

Author Not Available, "VoIP Emergency Calling Services", Intrado Informed Response, 2003. Intrado Inc., Longmont, Colorado, USA, pp. 1-3;.

Bells Ringing in Net Phone 911—CNET News.com by Ben Charny, staff writer, Dally Clips, Mar. 7, 2005, pp. 1-3;.

"FCC Addresses VoIP 911 Calls", BellSouth NewsSource from Staff and News Services, by Russell Grantham, May 8, 2005, p. 1;.

AG Files Suit Against Vonage over 911, BellSouth NewsSource, by Ted Gotsch, May 5, 2005, pp. 1-2;.

"FCC Boss Pushes 911 Plan", Bellsouth NewsSource from Staff and News Services, by Renee Degross, Apr. 28, 2005, pp. 1-2;.

"Helpless in a 911 Emergency; Some Internet Phone Services Leave Consumers Without a Lifeline," Newsday, Richard J. Dalton, Jr., May 11, 2005, pp. 1-3.

"Tests Show Many Cell phone Calls to 911 Go Unlocated", The Wall Street Journal, by Anne Marie Squeo, May 19, 2005, pp. 1-3;.

FCC to Rule on 911 Access for Web Phones. Washington Post, by Yuki Noguchi, Washington Post Staff Writer, May 18, 2005, pp. 1-3;.

BellSouth Clarifies View on VoIP '911' Availability, TR Daily, by Lynn Stanton, May 17, 2005, p. 1;.

"Level 3 Communications Sees 911 as its Edge in Internet Telephony", by Heather Draper, Dow Jones Newswires, Jun. 29, 2005, pp. 1-2;.

"The Development of 9-1-1", http://sorc911.com/9-1-1%20History.htm, May 21, 2004;.

"Cry for Help on the Internet", by Malcolm McConnell; Reader's Digest, Mar., 1998, pp. 192-198;.

Office Action dated Feb. 8, 2006 in U.S. Appl. No. 10/836,741;.
Amendment dated Sep. 17, 2007 in U.S. Appl. No. 10/836,741;.
Office Action dated Dec. 3, 2008 in U.S. Appl. No. 10/836,741;.
Examiner's Interview Summary dated Feb. 26, 2009 in U.S. Appl. No. 10/836,741.
Amendment dated Mar. 3, 2009 in U.S. Appl. No. 10/836,741.
Office Action dated May 27, 2009 in U.S. Appl. No. 10/836,741.
Amendment dated Aug. 5, 2009 in U.S. Appl. No. 10/836,741.
Final Office Action dated Sep. 14, 2009 in U.S. Appl. No. 10/836,741.
Amendment filed with RCE dated Dec. 14, 2009 in U.S. Appl. No. 10/836,741.
Office Action dated Jan. 6, 2010 in U.S. Appl. No. 10/836,741.
Amendment dated Apr. 5, 2010 in U.S. Appl. No. 10/836,741.
Notice of Allowance dated May 27, 2010 in U.S. Appl. No. 10/836,741.
Supplemental Notice of Allowance dated Jun. 17, 2010 in U.S. Appl. No. 10/836,741.
Office Action dated Apr. 3, 2008 in U.S. Appl. No. 10/855,140.
Amendment dated Jun. 27, 2008 in U.S. Appl. No. 10/855,140.
Office Action dated Oct. 15, 2008 in U.S. Appl. No. 10/855,140.
Terminal Disclaimer dated Jan. 13, 2009 in U.S. Appl. No. 10/855,140 over U.S. Appl. No. 10/836,741 (now US Patent 7,783,013).

Terminal Disclaimer dated Jan. 13, 2009 in U.S. Appl. No. 10/855,140 over U.S. Appl. No. 11/321,094.
Terminal Disclaimer Review Decision dated Feb. 4, 2009 in U.S. Appl. No. 10/855,140.
Amendment dated Jan. 13, 2009 in U.S. Appl. No. 10/855,140.
Notice of Allowance dated Apr. 27, 2009 in U.S. Appl. No. 10/855,140.
Supplemental Advisory Action dated Jun. 8, 2009 in U.S. Appl. No. 10/855,140.
Office Action dated Feb. 23, 2006 in U.S. Appl. No. 10/880,837.
Amendment dated Jun. 28, 2006 in U.S. Appl. No. 10/880,837.
Final Office Action dated Nov. 3, 2006 in U.S. Appl. No. 10/880,837.
Amendment filed with RCE dated Mar. 5, 2007 in U.S. Appl. No. 10/880,837.
Notice of Allowance dated May 17, 2007 in U.S. Appl. No. 10/880,837.
Office Action dated Nov. 27, 2001 in U.S. Appl. No. 09/376,876.
Amendment dated Jun. 11, 2002 in U.S. Appl. No. 09/376,876.
Examiner's Interview Summary dated Dec. 10, 2002 in U.S. Appl. No. 09/376,876.
Supplemental Amendment dated Jan. 16, 2003 in U.S. Appl. No. 09/376,876.
Office Action dated Feb. 27, 2003 in U.S. Appl. No. 09/376,876.
Amendment dated Jul. 21, 2003 in U.S. Appl. No. 09/376,876.
Final Office Action Oct. 08, 2003 in U.S. Appl. No. 09/376,876.
Examiner's Interview Summary dated Dec. 11, 2003 in U.S. Appl. No. 09/376,876.
Amendment after Final Office Action Mar. 11, 2004 in U.S. Appl. No. 09/376,876.
Advisory Action dated Mar. 19, 2004 in U.S. Appl. No. 09/376,876.
Amendment filed with RCE dated Jun. 8, 2004 in U.S. Appl. No. 09/376,876.
Amendment dated Oct. 22, 2004 in U.S. Appl. No. 09/376,876.
Office Action dated Feb. 15, 2005 in U.S. Appl. No. 09/376,876.
Amendment dated Jun. 20, 2005 in U.S. Appl. No. 09/376,876.
Final Office Action dated Sep. 7, 2005 in U.S. Appl. No. 09/376,876.
Amendment after Final Office Action dated Mar. 9, 2006 in U.S. Appl. No. 09/376,876.
Advisory Action dated Apr. 4, 2006 in U.S. Appl. No. 09/376,876.
Amendment filed with RCE dated May 8, 2006 in U.S. Appl. No. 09/376,876.
Office Action dated Jul. 17, 2006 in U.S. Appl. No. 09/376,876.
Amendment dated Nov. 20, 2006 in U.S. Appl. No. 09/376,876.
Final Office Action dated Feb. 12, 2007 in U.S. Appl. No. 09/376,876.
Amendment filed with RCE dated Oct. 17, 2007 in U.S. Appl. No. 09/376,876.
Notice of Allowance dated Jan. 3, 2008 in U.S. Appl. No. 09/376,876.
Office Action dated Nov. 25, 2009 in U.S. Appl. No. 11/321,094.
Notice of Abandonment dated Jan. 25, 2011 in U.S. Appl. No. 11/321,094.
Office Action dated Oct. 1, 2010 in U.S. Appl. No. 11/827,236.
Amendment dated Dec. 15, 2010 in U.S. Appl. No. 11/827,236.
Final Office Action dated Mar. 2, 2011 in U.S. Appl. No. 11/827,236.
Notice of Abandonment dated Sep. 9, 2011 in U.S. Appl. No. 11/827,236.
Author Not Available, Bellsouth E911 Service Interfaces To Customer Premises Equipment at a Public Safety Answering Point, Bellsouth Technical Reference, Apr., 2001, Issue 6, TR73528, 20 pages.
BellSouth Clarifies View on VoiP '911' Availability, TR Daily, by Lynn Stanton, May 17, 2005, 1 page.
"The Development of 9-1-1", http://sorc911.com/9-1-1%20History.htm, May 21, 2004, 2 pages.
Schulzrinne H. et al. "Providing Emergency Services In Internet Telephony", Department of Computer Science, Columbia University, New York, NY, 2002, 15 pages.
US 5,905,788, 05/1999, Bauer et al. (withdrawn)

* cited by examiner

METHODS, SYSTEMS, AND PRODUCTS FOR EMERGENCY COMMUNICATIONS

CROSS REFERENCE TO RELATED APPLICATIONS

This application is a continuation of U.S. application Ser. No. 10/855,140, filed May 27, 2004, now issued as U.S. Pat. No. 7,580,405, and incorporated herein by reference in its entirety.

Applicant(s) hereby rescind any disclaimer of claim scope in the parent application (namely U.S. application Ser. No. 10/855,140) or the prosecution history thereof and advise the US Patent and Trademark Office (USPTO) that the claims in this continuation application may be broader than any claim in the parent application. Accordingly, Applicant(s) notify the USPTO of a need to re-visit the disclaimer of claim scope in the parent application, and to further re-visit all prior art cited in the parent application, including but not limited to cited references over which any disclaimer of claim scope was made in the parent application or the prosecution history thereof. See *Hakim v. Cannon Avent Group, PLC*, 479 F.3d 1313 (Fed. Cir. 2007). Moreover, any disclaimer made in the current application should not be read into or against the parent.

This application also relates to U.S. application Ser. No. 10/836,741, filed Apr. 30, 2004 and to U.S. application Ser. No. 10/880,837, filed Jun. 30, 2004, with both applications incorporated herein by reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to Internet telephony, and, more particularly relates to methods for locating, routing, and/or processing an emergency communication from a Voice-Over Internet Protocol communications device.

2. Description of Related Art

Internet telephony, also referred to herein as Voice-Over Internet Protocol (VoIP), Voice-Over Network (VoN), and/or Internet Protocol Telephony (IP Telephony), is experiencing explosive growth and marked improvements in reliability and sound quality. The improved Internet telephony communications are, in large part, due to upgrading the internet backbone with better switching fabrics, such as Asynchronous Transfer Mode (ATM), and also due to implementation of new communications standards, such as standards for transport protocols, directory services, and/or audio codec format.

Along with these improvements come new challenges for the industry. For example, a need exists for better, more efficient emergency services in response to an emergency communication from an Internet telephony communications device. When an individual uses a conventional telephone to request an emergency service, such as dialing 9-1-1 to connect with a Public Safety Answering Point (PSAP), the telecommunications network uses network information associated with the communication (e.g., Automatic Number Identification (ANI), Automatic Location Identification (ALI), enhanced 9-1-1 services, and so on) to select/correlate a Public Safety Answering Point (PSAP) and to route the emergency call to the PSAP. The PSAP then uses the network information and/or additional information from a caller to dispatch one or more appropriate emergency service providers. Typically, the emergency service provider is matched with a geographic location, such as a billing address, of the telephone used to dial an emergency phone number to request the emergency service. However, when the caller uses a VoIP phone to request the emergency service, problems exist with routing and with dispatching appropriate emergency service providers. For example, if the caller uses a wireless VoIP communications device, then the wireless VoIP communications device may be used at different geographic locations to make the request for the emergency service, and consequently some network information, like the billing address, is not reliable for routing and/or other processing of the emergency service request to a nearby emergency service provider that is equipped to respond to the emergency request.

The growing popularity of wireless VoIP communications devices brings attention to the above and other emergency communication problems. Accordingly, what is needed are methods and systems for locating, routing, and/or other processing of emergency communications from internet telephony communications devices. Additionally, methods and systems that leverage the abilities of internet telephony communications devices and/or a connected communications network are further needed for these emergency communications.

SUMMARY OF THE INVENTION

This invention addresses the above needs and other needs by providing methods, systems, computer programs, and computer program products to route and/or process an emergency communications signal from an Internet telephony communications device. This invention, in particular, involves a Voice-Over Internet Protocol (VoIP) communications device equipped with a location positioning system and also equipped with an emergency communications computer software product. The emergency communications computer software product (also referred to herein as the "emergency communications module") detects and compares an outgoing Internet Protocol-based communications address with one or more emergency Internet Protocol-based communications addresses. If the Internet Protocol-based communications address is an emergency Internet Protocol-based communications address, then the emergency communications module activates the positioning system to determine the location coordinates and to associate these coordinates and other information with an emergency communications signal. Thereafter, the emergency communications signal is communicated via a data network (and/or a telecommunications network) for routing and processing to the emergency Internet Protocol-based communications address, or alternatively, to a selected emergency response center registered and/or identified with an emergency services provider. According to some of the embodiments of this invention, the selected emergency response center communicates via an Internet Protocol-based communications address.

According to embodiments of this invention, a method of processing emergency communications includes receiving an Internet Protocol-based communications address from a VoIP communications device and associating the Internet Protocol-based communications address with an emergency Internet Protocol-based communications address. The method continues if the Internet Protocol-based communications address matches an emergency Internet Protocol-based communications address, and the method then includes using an integrated positioning system to determine the location co-ordinates of the VoIP communications device, associating the location co-ordinates and an emergency communications profile with an emergency communications signal, accessing emergency data and/or associating an emergency data communications address of the emergency data with the emergency communications signal, and/or communicating the emergency communications signal to a communications network. According to embodiments of this invention, the positioning system may be a target-based positioning system, such as a global positioning system, infrared, radio frequency, and other wireless tracking/locating target-based systems that enable the VoIP communications device to determine its own location co-ordinates. And, according to further embodiments, the positioning system may be a hybrid positioning system that includes the target-based system as well as a querier-based system, such as a network that maps a router location (or other network component) closest to the VoIP communications device. The method may further include the communications network detecting, decoding, and communicating the emergency communications signal to the emergency Internet Protocol-based communications address. If emergency data is remotely stored, than the communications network may concurrently communicate the emergency communications signal to the emergency Internet Protocol-based communications address and also access and communicate with the emergency data communications address to retrieve the emergency data and communicate the emergency data to the emergency Internet Protocol-based communications address. When an Internet Protocol-based communications address is detected from the VoIP communications device, the Internet Protocol-based communications address is associated with a database of emergency Internet Protocol-based communications addresses to determine if the Internet Protocol-based communications address is an emergency Internet Protocol-based communications address (e.g., 911, local police, fire, and other emergency service providers). If the Internet Protocol-based communications address matches an emergency Internet Protocol-based communications address, then location co-ordinates (e.g., latitude, longitude) of the VoIP communications device are determined using a positioning system of the VoIP communications device. The location co-ordinates and an emergency communications profile are associated with the emergency communications signal and the emergency communications signal is communicated to a communications network. The emergency communications profile may include emergency data, an emergency data communications address for accessing the emergency data, and/or one or more emergency Internet Protocol-based communications addresses. The communications network detects, decodes, and, if the emergency Internet Protocol-based communications address is a stored in a database of registered and/or otherwise identified emergency response providers, then matches the location coordinates of the emergency communications signal to a selected emergency response provider and connects the emergency communications signal to a communications address of the selected emergency response provider. If the emergency Internet Protocol-based communications address is a user-defined communications address (i.e., the emergency Internet Protocol-based communications address is an Internet Protocol-based communications address selected by a user and is not registered and/or otherwise identified emergency response provider, such as an emergency service provider in a public database—the police, fire department, emergency medical personnel, poison control, and other registered providers of emergency services), then the communications network does not have to match the location coordinates. Rather, the communications network detects and decodes the emergency communications signal and forwards the emergency communications signal to the emergency Internet Protocol-based communications address identified in the emergency communications signal from the VoIP communications device.

In further embodiments, the method includes communicating the emergency communications signal to the communications address of the selected emergency service provider (or, alternatively, the user defined emergency Internet Protocol-based communications address) via a data network, a telecommunications network, and/or a remote server/database. For example, the associated emergency data may be stored on the remote server/database. Furthermore, when the emergency data is remotely stored, the emergency communications signal including the location coordinates, a "linked" emergency data communications address for accessing the associated emergency data, and/or a data and/or voice communication may be communicated from the VoIP communications device to a data network for processing to the selected communications address. Thereafter, the remote, associated emergency data may be accessed over the linked emergency data communications address to the remote server/database, or alternatively, to the telecommunications network. Still other embodiments include the above method with alternate communications devices (i.e., communications devices other than a VoIP phone), such as, for example, a personal computer, a laptop, a pager, a personal digital assistant, a musical recording device, a digital signal processor, and an Interactive television.

According to other embodiments of this invention, an emergency communications system includes a communications device with a position locating system and with an emergency communications module stored in memory and includes a communications interface. The emergency communications module includes a computer program product that accesses an emergency communications profile of one or more emergency Internet Protocol-based communications addresses, emergency data, and/or one or more emergency data communications address for accessing the emergency data. The communications interface communicates an emergency communications signal to a communications network to connect with the emergency Internet Protocol-based communications address, or alternatively, to connect with a communications address of a selected emergency service provider associated by the location coordinates and/or with the user-identified emergency Internet Protocol-based communications address. The emergency communications signal includes the location co-ordinates, one or more emergency Internet Protocol-based communications addresses, a communications signal, the emergency data, and/or one or more emergency data communications addresses for accessing the emergency data. In further embodiments, the system includes a communications network that analyzes the emergency communications signal to select the emergency service provider, and thereafter, communicates the emergency communications signal to the communications address of the selected emergency service provider.

According to additional embodiments of this invention, a computer program product includes a computer-readable medium and an emergency communications module stored on the computer readable medium. The emergency communications module detects an emergency Internet Protocol-based communications address, activates a positioning system to determine location co-ordinates, and associates the location co-ordinates and an emergency communications profile with an emergency communications signal. In further embodiments, the emergency communications module initiates communication of the emergency communications signal to a communications network. Similar to the above embodiments, the emergency communications profile may include emergency data, one or more emergency data communications addresses, and/or one or more emergency Internet Protocol-based communications address. According to various embodiments, the computer-readable medium may be stored in a VoIP communications device, a personal computer system, a communications network, an alternate communications device, and/or a remote data server.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
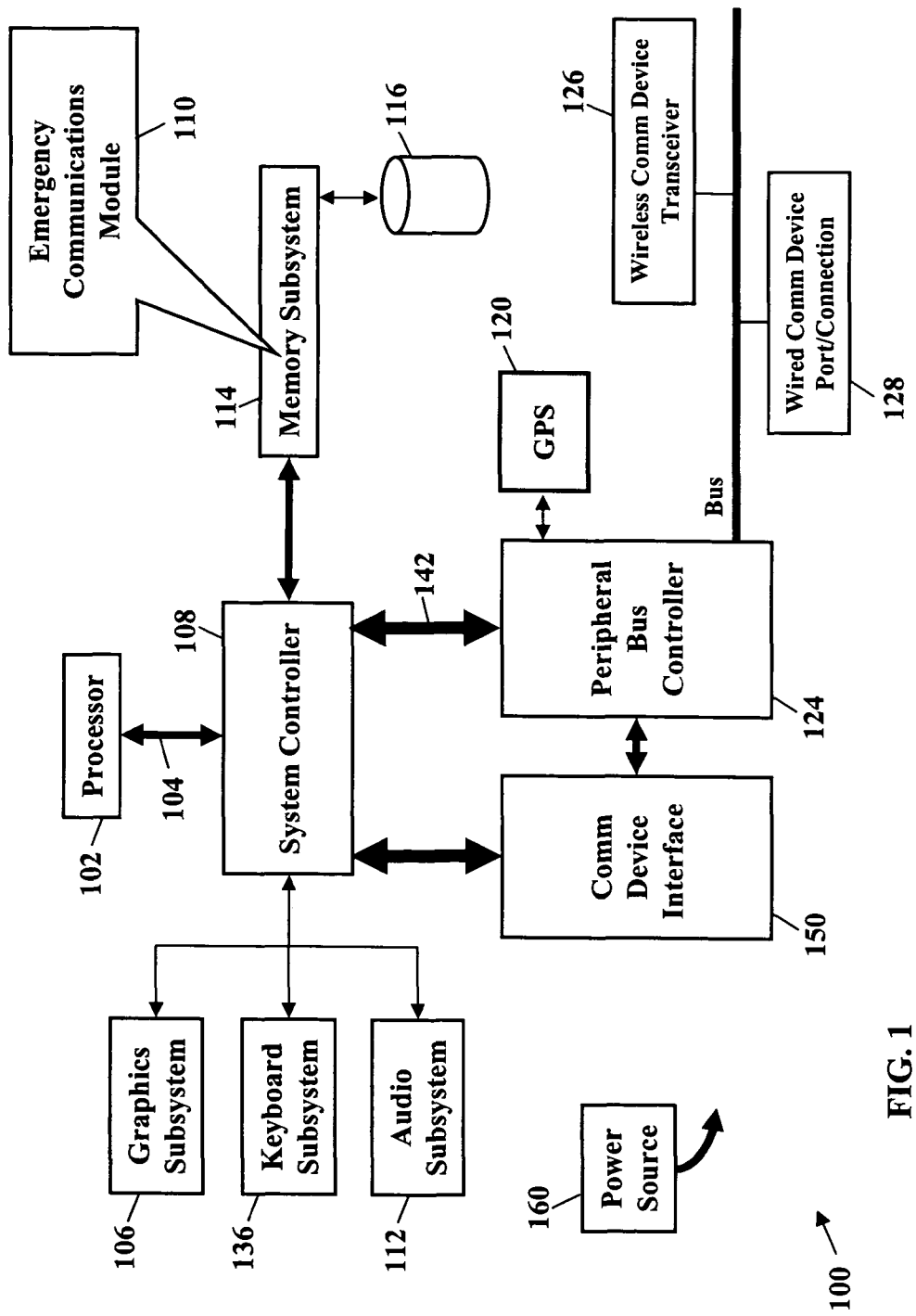
FIG. 1 illustrates a block diagram of an operating system according to some of the exemplary embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides systems, methods, and computer program products for locating, routing, and/or otherwise processing an emergency communications signal from a VoIP communications device to an emergency Internet Protocol-based communications address. The VoIP communications device is equipped with a location positioning system and an emergency communications module. The emergency communications module detects and compares an outgoing Internet Protocol-based communications address (e.g., an electronic data communications address, such as, for example, a URL address, an email address, an IP address, and/or others) with one or more emergency Internet Protocol-based communications addresses stored in an emergency communications profile to determine if the Internet Protocol-based communications address matches an emergency Internet Protocol-based communications address. As used herein, the term "emergency Internet Protocol-based communications address" refers to an electronic data communications address that is used to (1) request emergency service or help, (2) co-ordinate emergency service response, and/or (3) notify and/or communicate with a party (e.g., a public entity, a selected individual such as a relative or friend of the VoIP communications device, and/or others) about an emergency. If the Internet Protocol-based communications address matches an emergency Internet Protocol-based communications address, then the emergency communication module activates the positioning system to determine the location co-ordinates and to associate these co-ordinates and other information (e.g., associated emergency data and the communications signal (data and/or voice) for communication between the user of the VoIP device and a party at the emergency Internet Protocol-based communications address) with an emergency communications signal. Thereafter, the emergency communications signal is communicated with a communications network for routing and otherwise for processing to the emergency Internet Protocol-based communications address, or alternatively, to a communications address of a selected online emergency service provider. According to embodiments of this invention, the emergency communications signal may be communicated to a data network that detects and decodes the emergency communications signal to access and analyze the location co-ordinates with a database of one or more online emergency service providers (e.g., an online public safety center that dispatches and/or consults with police, fire, medical, and other emergency response personnel to provide emergency services for a geographic service area) and then to route the emergency communications signal to the selected online emergency service provider that services the geographic area matched with the location co-ordinates. Alternate embodiments allow the user to program an emergency Internet Protocol-based communications address that is not registered and/or identified with an emergency service provider. For example, the user may select on online emergency communications address for his/her doctor's office as a user-defined emergency Internet Protocol-based communications address. According to further embodiments, the emergency communications signal may include emergency data (and/or a communications link to emergency data) so that a party receiving the routed emergency communications signal (e.g., the online emergency services center) can use and/or access the emergency data and communicate the emergency data to personnel responding to the emergency (e.g., the emergency service provider, a nurse at a called doctor's office, and others).

Referring now to the figures, FIG. 1 illustrates an operating system according to embodiments of this invention. FIG. 1 is a block diagram showing the Emergency Communications Module 110 residing in a computer system shown as VoIP communications device 100. As FIG. 1 shows, the Emergency Communications Module 110 operates within a system memory device. The Emergency Communications Module 110, for example, is shown residing in a memory subsystem 114. The Emergency Communications Module 110, however, could also reside in flash memory 126 or a peripheral storage device 116. The VoIP communications device 100 also has one or more central processors 102 executing an operating system. The operating system, as is well known in the art, has a set of instructions that control the internal functions of the VoIP communications device 100. A communications interface 104 communicates signals, such as an emergency communications signal (shown in as reference number 242 in FIGS. 2-6), data signals, control signals, and address signals, between the central processor 102 and a system controller 108 (typically called a "Northbridge"). Additionally, the communications interface 104 has a means to communicate a communications signal (such an emergency communications signal shown as reference numeral 242 in FIGS. 2-7) between the VoIP communications device 100 and a communications network (such as a data network shown as reference number 210 in FIGS. 2-6).

The system controller 108 provides a bridging function between the one or more central processors 102, a graphics subsystem 106, a keyboard subsystem 136, an audio subsystem 112, the memory subsystem 114, a PCI (Peripheral Controller Interface) bus 142, and a Communications ("Comm") Device Interface 150. The PCI bus 142 is controlled by a Peripheral Bus Controller 124. The Peripheral Bus Controller 124 (typically called a "Southbridge") is an integrated circuit that serves as an input/output hub for a location positioning system shown as a Global Positioning System (GPS) 120 and for various peripheral ports and/or transceivers. According to embodiments of this invention, alternate positioning systems may include supplemental target-based positioning system (e.g., systems using infrared, radio frequency, and other wireless tracking/locating target-based systems) and may also include a hybrid positioning system that includes the target-based system as well as a querier-based system (e.g., a network that maps a location of a network component (e.g., a router, a port, and others) closest to the VoIP communications device 100). The above-identified peripheral ports allow the VoIP communications device 100 to communicate with a variety of devices through networking ports (such as SCSI or Ethernet) and/or transceivers that include Wireless Communications ("Comm") Device Transceiver 126 (for communication of any frequency signal in the electromagnetic spectrum, such as, for example, Wireless 802.11 and Infrared) and Wired Communications ("Comm") Device Port/Connection 128 (such as modem V90+ and compact flash slots). These peripheral ports could also include other networking ports, such as, a serial port (not shown) and/or a parallel port (not shown). The Comm Device Interface 150 allows the VoIP communications device 100 to monitor, detect, receive, and decode incoming communications signals to the communications device(s) connected to the Wireless Comm Device Transceiver 126 and/or the Wired Comm Device Port/Connection 128. Further, the Comm Device Interface 150 transmits a communications signal (such as emergency communications signal 242 of FIGS. 2-6) to the Wireless Comm Device Transceiver 126 and/or the Wired Comm Device Port/Connection 128. Still further, the VoIP communications device 100 may include a power source 160, such as a rechargeable battery to provide power and allow the VoIP communications device 100 to be portable. In alternate embodiments, the location position system may be an alternative position locating system known by those of ordinary skill in the art. Additionally, those of ordinary skill in the art understand that the program, processes, methods, and systems described in this patent are not limited to any particular computer system or computer hardware.

Those of ordinary skill in the art also understand the central processor 102 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 114 and/or peripheral storage device 116) may also contain an application program. The application program cooperates with the operating system and with a display unit to provide a Graphical User Interface (GUI). The Graphical User Interface typically allows a user to input a combination of signals (such as signals communicated from the audio subsystem 112, graphics subsystem 106, and/or keyboard subsystem 136 and/or alternative input devices). The Graphical User Interface provides a convenient visual and/or audible interface with the user of the VoIP communications device 100.

Figure 2:
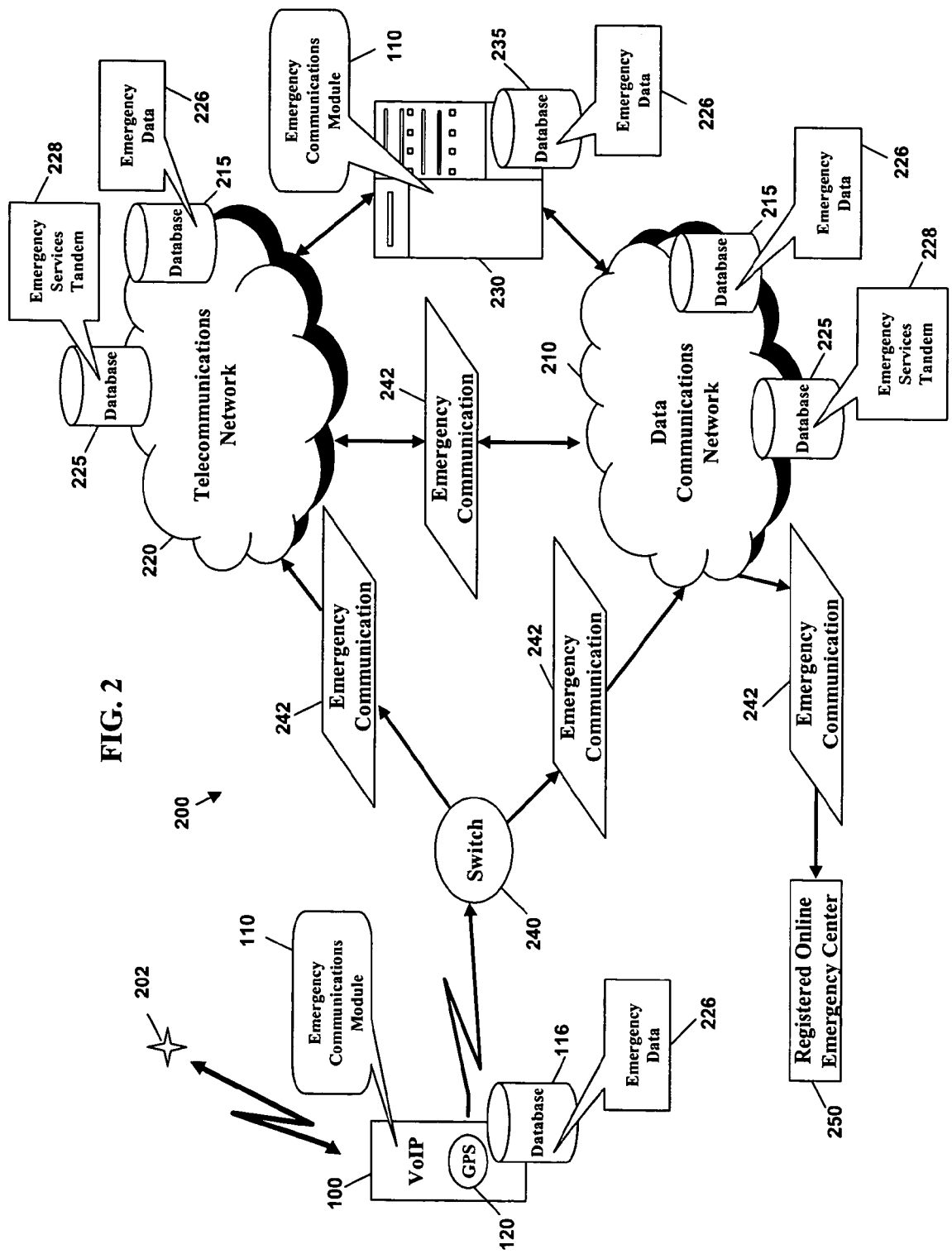
FIG. 2 illustrates an operating environment for providing emergency communications over one or more communications networks according to some of the exemplary embodiments of this invention.
Figure 6:
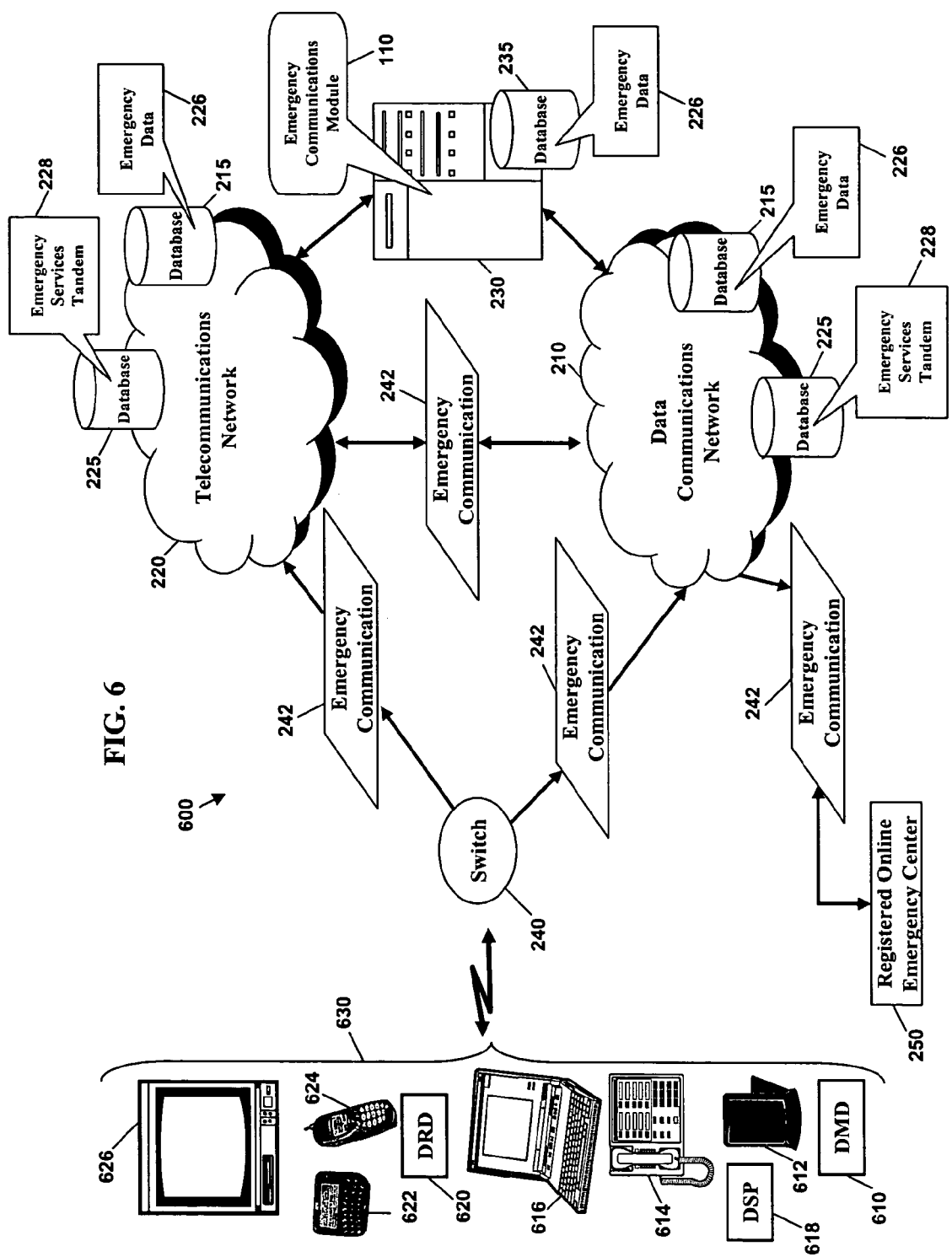
FIGS. 6 and 7 further illustrate other operating environments for providing emergency communications according to some of the exemplary embodiments of this invention.

As shown in FIG. 2, an emergency communications system 200 includes the VoIP communications device 100 having the Emergency Communications Module 110 and the database 116 with emergency data 226, a voice/data communications switch 240, an emergency communications signal 242, a data communications network 210 including a database 215 with emergency data 226 and a server/database 225 with emergency services tandem data 226 for matching an online emergency services provider to the emergency Internet Protocol-based communications address, a selected online emergency services center (also referred to as the "network selected emergency response communications address" or referred to as "registered online emergency center" in FIGS. 2 and 6) 250, a remote server 230 including the Emergency Communications Module 110 and a database 235 with emergency data 226, a telecommunications network 220 having another server/database 225 with emergency service tandem data 228. The communications switch 240 may include a packet-based "softswitch" that uses software control to provide data, voice, and/or video services by dynamically changing its connection data rates and protocols types. In this case, an application server (not shown) interfaces with the softswitch via a packet protocol, such as Session Initiation Protocol (SIP). In addition, the communications switch 240 enables hybrid communications with both an Internet Protocol-based communications network (e.g., the data network 210) and with the telecommunications network. Accordingly, the communications switch may include Advanced Intelligent Network (AIN) componentry controlling many features of the communications with the telecommunications network 220. The signaling between the voice/data switch 240, the data network 210, and/or the telecommunications network 220, however, is well understood in the art and will not be further described.

According to some of the embodiments of this invention, the Emergency Communications Module 110 analyzes an outgoing Internet Protocol-based communications addresses (e.g., an IP address, an email address, a URL address, and other electronic data communications addresses) of the VoIP communications device 100 to determine if the outgoing Internet Protocol-based communications address is an emergency Internet Protocol-based communications address. As used herein, the term "emergency Internet Protocol-based communications address" refers to an electronic data communications address that is used to (1) request emergency service or help, (2) co-ordinate emergency service response, and/or (3) notify and/or communicate with a party (e.g., a public entity, a selected individual such as a relative or friend of the VoIP communications device, and/or others) about an emergency. For example, if a user of the VoIP communications device 100 inputs a message addressed to an online emergency services center from keyboard subsystem 136, then the Emergency Communications Module 110 would detect the outgoing Internet Protocol-based communications address and compare the outgoing Internet Protocol-based communications address with a database of emergency Internet Protocol-based communications addresses for a match. For example, if a public entity uses "911.gov" (or, alternatively, "911.com," "911.net," "911.org," "911.edu," as well as other extensions/categories of domain names that could be associated with 911) as an emergency communications address, then a "911.gov" address input by a user would match an emergency Internet Protocol-based communications address. Still other examples include alternative domain names (e.g., "112.<any extension>") as well as a Session Initiation Protocol (SIP) URL (e.g., "police@virginia.<any extension>" or "fire 911.<any extension>"). Moreover, the Emergency Communications Module 110 may be programmed to automatically recognize and/or associate key entries (such as "help" or "911" or other character strings) to automatically formulate outgoing emergency IP-based communications. Once the emergency Internet Protocol-based communications address is identified, the Emergency Communications Module 110 associates an emergency communications profile and activates the GPS 120 to determine location co-ordinates of the VoIP communications device 100. According to alternate embodiments of this invention, the location positioning system may be any target-based location positioning system that enables the VoIP communications device to determine its own location to forward with the emergency communications signal 242, such as, for example, infrared (IR) and/or radio frequency (RF) transmitters, receivers, and/or sensors. The emergency communications profile may include the emergency Internet Protocol-based communications address, other associated emergency Internet Protocol-based communications addresses (e.g., if "911.gov" is correlated with the user-input Internet Protocol communications address, then the emergency communications profile associates Dr. Smith's communications address, and concurrently communicates the emergency communications signal 242 to the emergency Internet Protocol-based communications address and to the associated address(es)), emergency data (e.g., medical information, personal information, and other information), and/or a communications link for accessing remotely stored emergency data (e.g., an emergency data communications address of a remote database). The Emergency Communications Module 110 associates and analyzes the location co-ordinates and the emergency communications profile to generate the emergency communications signal 242 that includes the communications signal (e.g., the data and/or voice signal), the emergency Internet Protocol-based communications address(es), associated address(es), the location co-ordinates, the emergency data, and/or the communications link to the remotely stored emergency data (also referred to as the "emergency data communications address"). Thereafter, the emergency communications signal 242 is communicated to the communications switch 240 for routing to the data communications network 210 and/or to the telecommunications network 220 that analyzes the emergency communications signal 242 for routing and/or further processing. For example, if the data network 210 detects a registered emergency Internet Protocol-based communications address (e.g., "911.gov"), then the data network 210 decodes the location co-ordinates of the emergency communications signal 242 and correlates the location co-ordinates with location co-ordinates of one or more registered/identified online emergency services center(s) in the database 225 of emergency services tandems 228 to select the online emergency service center 250 (also referred to as the "network selected emergency response communications (ERC) address") and to connect the emergency communications signal 242 with the online emergency service center 250. The online emergency services center 250 may co-ordinate emergency response providers similar to a public safety answering point (PSAP) of the 9-1-1 telephone-based system used in the United States. Communications with the online emergency services center 250, however, are addressed to an electronic data communications address whereas communications with the PSAP are addressed to a telecommunications address (e.g., dialing the digits of 911). Still further, the online emergency services center(s) in the database 225 of emergency services tandems 228 may be registered by a national, state, local, or other governmental entity and/or may be otherwise identified by the public as an online provider for emergency services.

When establishing the emergency communications profile for each emergency Internet Protocol-based communications address, the user may interact with a GUI of the Emergency Communications Module 110 to input and/or to select the emergency Internet Protocol-based communications address (e.g., to input a doctor's emergency online communications address to define as a user-defined emergency Internet Protocol-based communications address), emergency data, and/or an associated emergency data communications address to communicate with the emergency communications signal. Alternatively, the emergency communications profile may contain default parameters, such as a database of registered governmental and/or otherwise identified emergency Internet Protocol-based communications addresses, emergency data related to an owner of the VoIP communications device 100 such as a home address, name, and financial information, and/or an emergency data communications address associated with a history of communications links correlating key words such as "doctor," "medical," "emergency contact," and others. The emergency data may include any information that the user inputs and/or selects to communicate with the emergency communications signal 242, and may include such data as a phone number for an emergency contact, name of user, name of the owner, addresses, medical information and instructions such as known allergies and current medications, legal information (e.g., instructions to not resuscitate), security information such as user identifications and passwords, and other emergency information. The emergency data could also include medical insurance information, such as provider name, policy number, group number, and other insurance information that a medical provider might require. The emergency data may include audio files, pictures, charts, data files, or any other electronic data that augments, explains, and/or accompanies the emergency communication (e.g., a subsequent voice signal to an initial data signal of the emergency communications signal 242). For example, as the user and the party (i.e., the party receiving the incoming emergency communications signal 242) communicate digital images and text messages, the user (and/or the party) may initiate voice communications to have a conversation with the party.

When the data network 210 detects the emergency communications signal 242 and decodes it to identify the emergency data communications address for accessing remote emergency data, the data network 210 may communicate with the telecommunications address 220 to access and retrieve the emergency data (when the emergency data communications address is associated with a storage device accessed via the telecommunications network 220) and push the remotely stored emergency data with the emergency communications signal 242 to the online emergency services center 250. Alternatively, the data network 210 may communicate the emergency communications signal 242 to the online emergency services center 250 with a communications link that enables the online center 250 to initiate access to and retrieval of the emergency data. According to the embodiments shown in FIG. 2, the data network 210 may access the database 235 of server 230 to retrieve and/or bundle the emergency data 226 for communication to online emergency services center 250. If, however, the emergency data 226 is locally stored on database 116 of the VoIP communications device 100, then the emergency data is communicated from the VoIP communications device 100 to the data network 210.

Some of the emergency data may be stored on the database 116 of the VoIP communications device 100 and some of the emergency data may be remotely stored.

Because the VoIP communications device 100 of FIG. 2 may operate in a wireless environment, the VoIP communications device 100 may originate a communications signal from any location having access to a communications network. For example, the user may initiate a communications signal from the VoIP communications device 100 in one location, but then, as the user moves about (or if the VoIP communications device 100 is moved by another means) during a communications connection, the location of the VoIP communications device 100 changes. An advantage of this invention is to pinpoint location co-ordinates and communicate these co-ordinates to the emergency service personnel responding to the emergency communications. According to an embodiment, the Emergency Communications Module 110 refreshes the location co-ordinates according to a selected time interval (such as, for example, at least every fifteen (15) seconds) and communicates the updated location co-ordinates with the emergency communications signal 242. While the initial location co-ordinates are used by the data network 210 to select/correlate the online emergency services center 250 having a proximate geographic location (i.e., the service area of the online emergency services center 250 is correlated to the location co-ordinates initially transmitted with the emergency communications signal 242), the updated location co-ordinates are communicated to online emergency services center 250, and if helpful, online emergency services center 250 may communicate these updated co-ordinates to the responding emergency personnel. An example might be when the user of VoIP communications device 100 sends an emergency communication from a burning building to request help. The user may initiate the emergency communications signal 242 from a third floor of the building, and in an attempt to exit the building, the user may change his/her location to another floor. If the emergency response personnel try to locate the user, these updated co-ordinates may provide more precise information on the user's proximate location (if the user still has the VoIP communications device 100). The updated location coordinates could be visually presented to track/plot the movements of the VoIP communications device 100. The Emergency Communications Module 110 could even extrapolate a current position in the absence of the updated location coordinates. That is, should the updated location coordinates become unavailable and/or not receivable, a current location could be extrapolated/estimated/predicted from the last known location coordinate(s).

Figure 3:
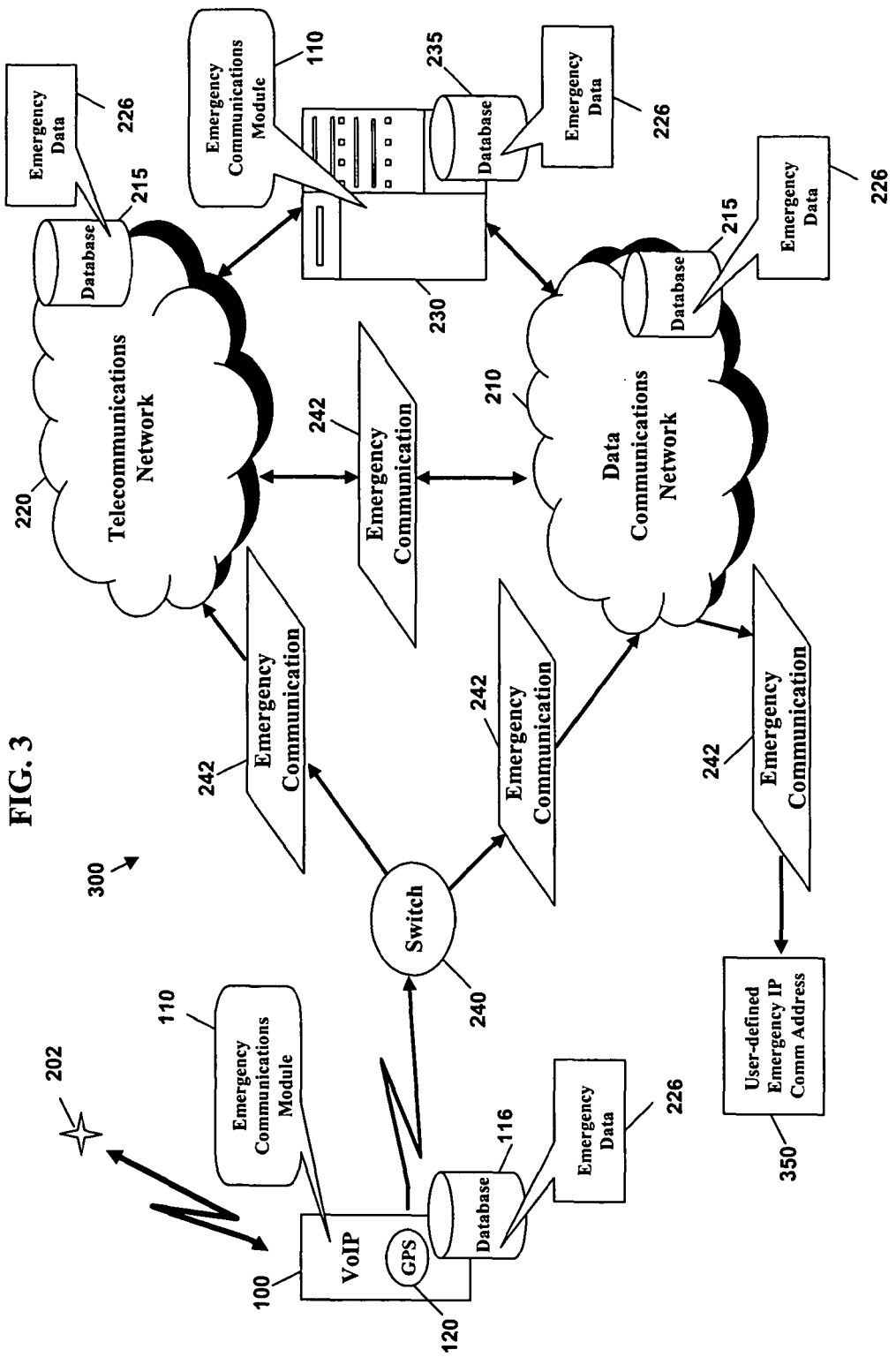
FIG. 3 illustrates another operating environment for providing emergency communications according to some of the exemplary embodiments of this invention.

FIG. 3 illustrates an emergency communications system 300 similar to the emergency communications system 200 of FIG. 2; however, the emergency communications system 300 communicates an emergency communications signal 242 to a user-defined, non-registered emergency Internet Protocol-based communications address 350 instead of the network selected emergency communications address 250. The user-defined emergency Internet Protocol-based communications address is an electronic data communications address that is not associated with a registered or otherwise identified emergency Internet Protocol-based communications address for online emergency services. For example, the user may interact with a GUI of the Emergency Communications Module 110 to select and/or associate an electronic data communications address of a physician, a local emergency bulletin board, a hospital, and/or others as an emergency Internet Protocol-based communications address.

Figure 4:
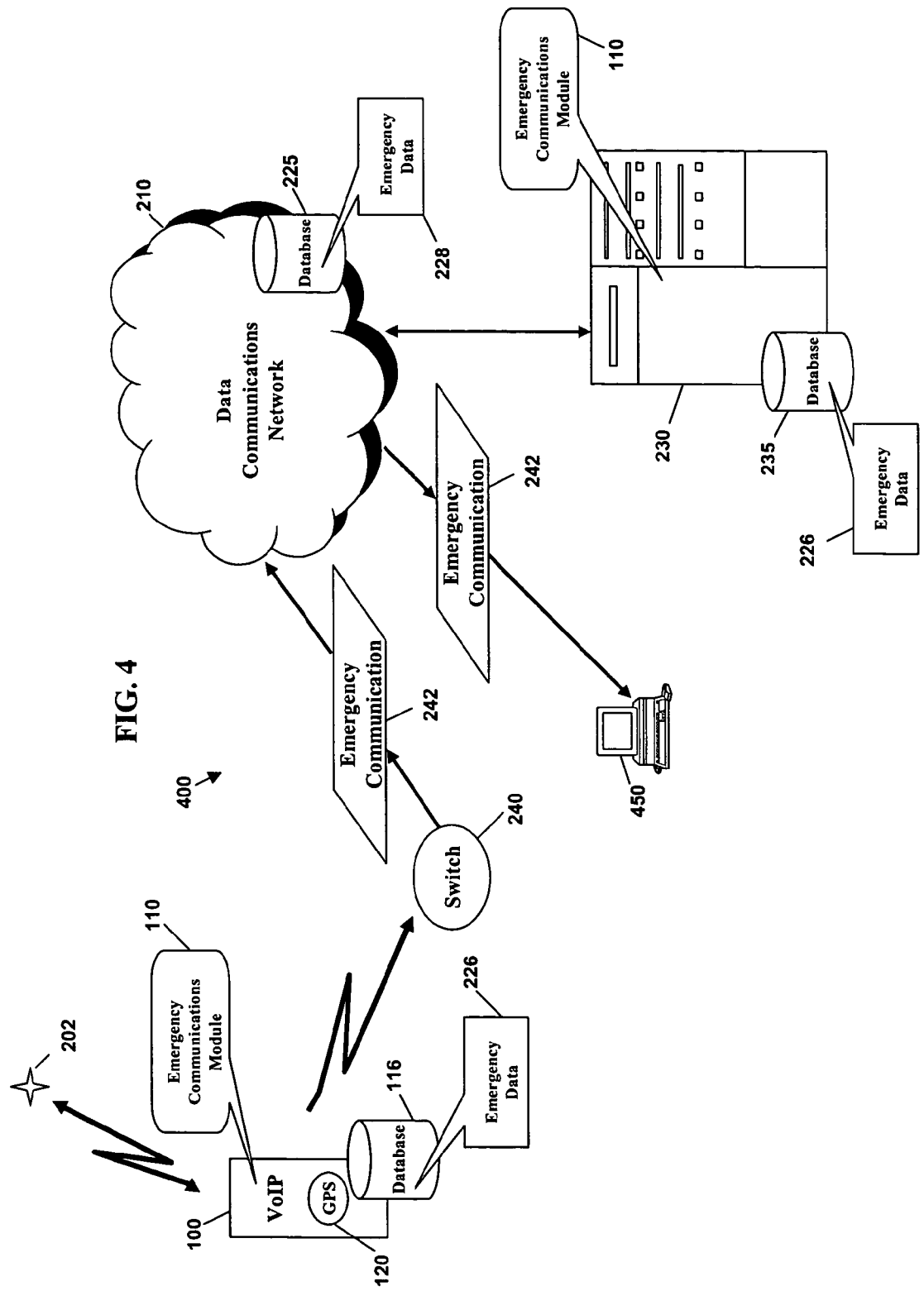
FIGS. 4 and 5 illustrate yet other operating environments for providing emergency communications over a data network according to some of the exemplary embodiments of this invention.
Figure 5:
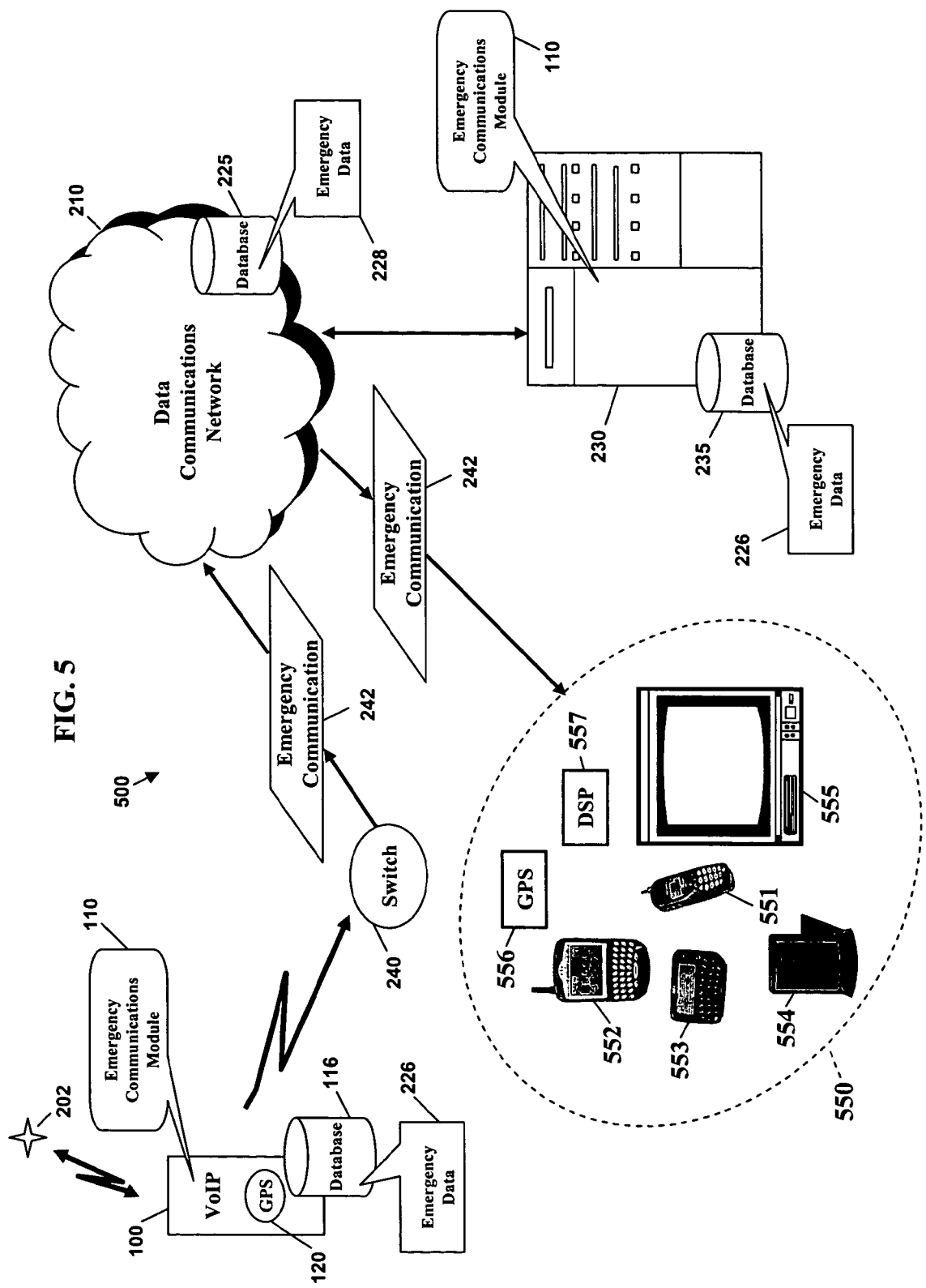

FIG. 4 illustrates an emergency communications system 400 communicating the emergency communications signal 242 from the VoIP communications device 100 to a user-defined, non-registered emergency Internet Protocol-based communications address of a personal computer 450 connected with the data network 210. As discussed above, the personal computer 450 may have an electronic data communications address of the physician, the local emergency bulletin board, the hospital, and/or others. A party using the personal computer 450 receives the emergency communications signal 242 and may according respond to the emergency communication. FIG. 5 illustrates another emergency communications system 500 similar to the emergency communications system 400 of FIG. 4; however, emergency communications system 500 illustrates alternate communications devices 550 of the user-defined, non-registered emergency Internet Protocol-based communications address. These alternate communications devices 550 include a cellular phone 551, another VoIP phone 552, a pager 553, a personal digital assistant (PDA) 554, an interactive television 555, a global positioning system 556, and/or any communications device having a digital signal processor 557. In emergency communications systems 400 and 500, the VoIP communications device 100 communicates the emergency communications signal 242 to the voice/data switch 240 for communication to the data network 210 for routing and/or further processing to the emergency Internet Protocol-based communications address. According to these embodiments, the emergency data 226 may be stored in the database 116 of VoIP communications device's 100, the database 225 of data network 210, and/or the database 235 of remote server 230. That is, the switch 240 detects and decodes the emergency communications signal 242 to determine that the emergency Internet Protocol-based communications address(es) is/are an electronic data address (e.g., a web-based address, an email, an IP address, an address associated with database 235 of remote server 230, and so on) and that the emergency data 226 is communicated with the emergency communications signal 242 or is accessible by the data network 210. Thus, the voice/data switch 240 does not communicate the emergency communications signal 242 to the telecommunications network 220. Further, because the emergency Internet Protocol-based communications address is a user-defined address, the database 225 of emergency services tandems 228 is not needed. However, if the emergency Internet Protocol-based communications address is a registered and/or otherwise identified emergency Internet Protocol-based communications address, then the database 225 of emergency services tandems 228 may need to be included.

Figure 7:
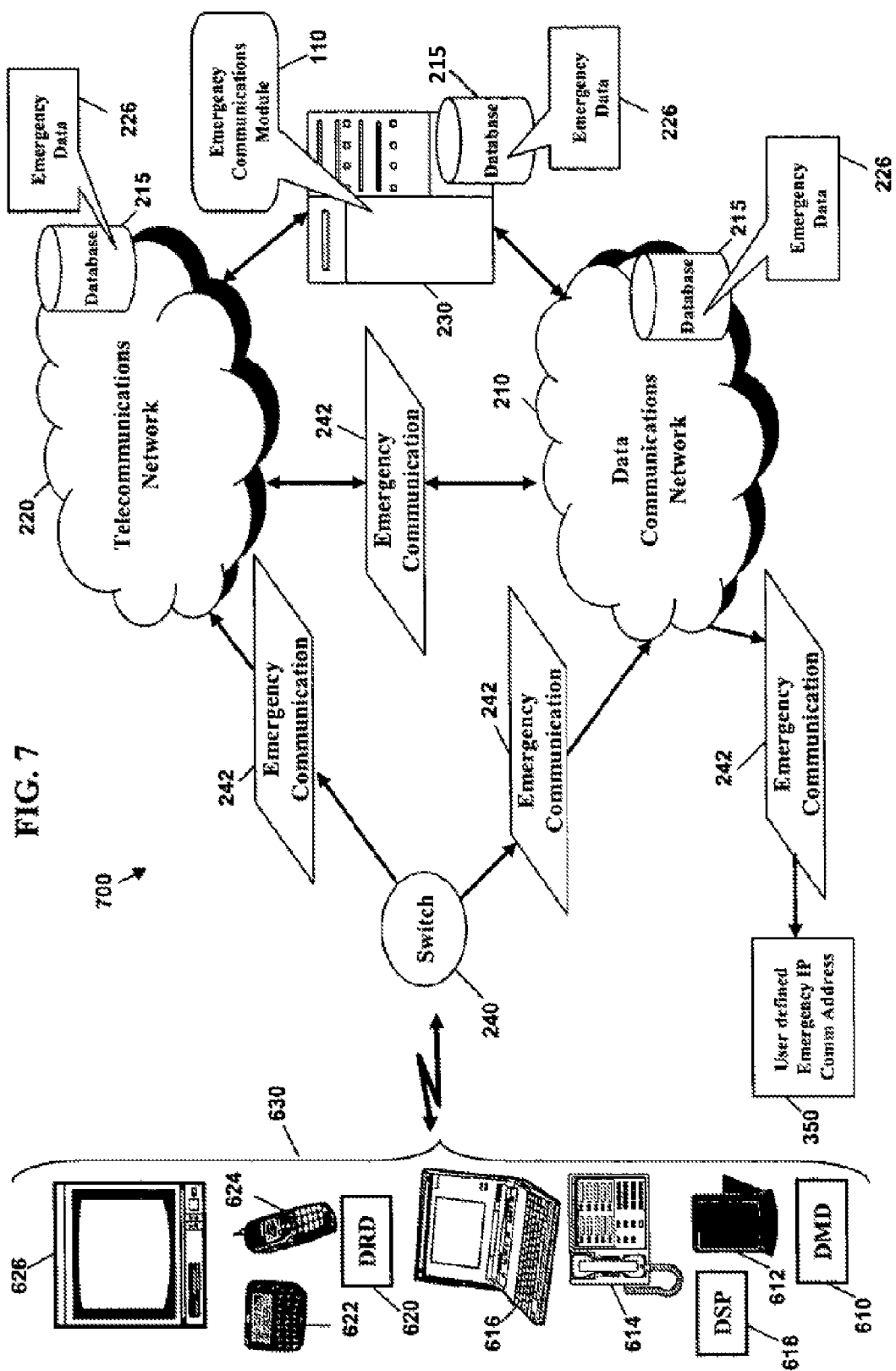

FIG. 6 illustrates another emergency communications system 600 similar to the emergency communications system 200 of FIG. 2; however, the emergency communications system 600 illustrates various alternate communication devices 630 (each having the Emergency Communications Module 110) that may be used instead of the VoIP communications device 100 for communicating the emergency communications signal 242 to the network selected emergency communications address 250 via the data communications network 210 and/or the telecommunications network 220. These various alternate communication devices 630 include a digital music device (DMD) 610, a personal digital assistant (PDA) 612, a computer system 616, a digital signal processor (DSP) 618, a digital recording device (DRD) 620, a pager 622, a cellular phone 624, and an interactive television 626. And, FIG. 7 illustrates yet another emergency communications system 700 similar to the emergency communications system 600 of FIG. 6; however, the emergency communications system 700 illustrates various alternate communication devices 630 communicating the emergency communications signal 242 to the user-defined emergency Internet Protocol-based communications address 350 via the data communications network 210 and/or the telecommunications network 220.

The term "processing," as used herein, encompasses every event from the time the user inputs or selects an Internet Protocol-based communications address via the VoIP communications device 100 (or alternate communications devices 630) to the termination of the communication with the emergency Internet Protocol-based communications address. "Processing" of the emergency communications signal 242 could include routing a voice/data communications path, signaling setup, and/or intelligence (e.g., IP queries, standard signaling messages to determine call routing paths, Local Number Portability queries, queries to retrieve Calling Name/Number information, AIN queries, and others). The term "processing" may also include monitoring an established connection between the VoIP communications device 100 and the emergency Internet Protocol-based communications address (e.g., the online emergency services center 250 in FIGS. 2 and 6 and the user-defined Internet Protocol communications address 350 of FIGS. 3, 4, 5, and 7) for possible events that indicate a party has requested, transmitted, received, and/or accessed any electronic data of the emergency communications signal 242. "Processing," may further encompass billing activities and measurements at a switch or other network element.

Figure 8:
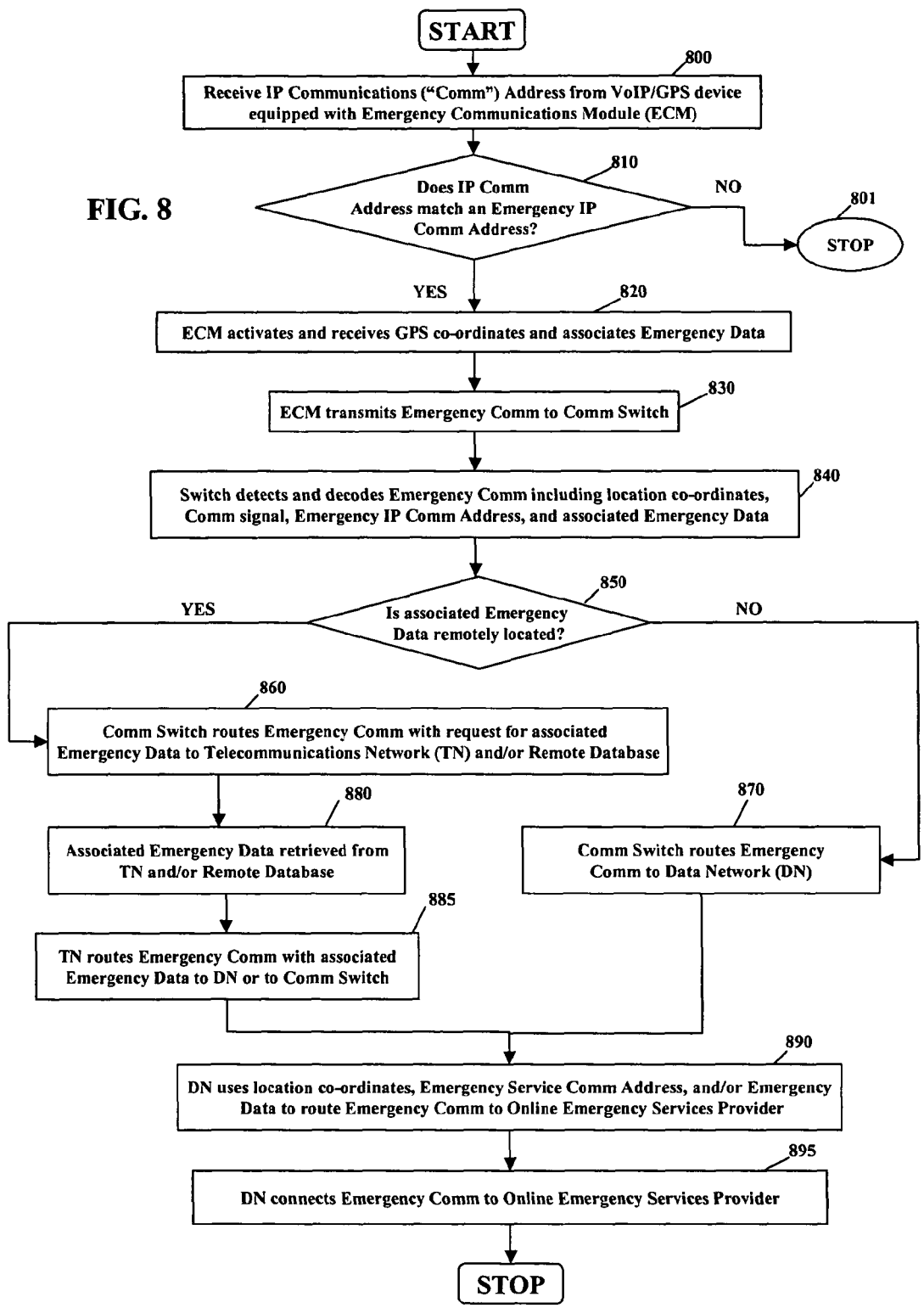
FIG. 8 is a flowchart illustrating methods for providing emergency communications according to some of the exemplary embodiments of this invention.

FIG. 8 is a flowchart showing processes of providing emergency communications according to embodiments of this invention. A positioning system, such as a global positioning system, and an Emergency Communications Module equipped VoIP communications device receives an Internet Protocol-based communications address (referred to as an "IP comm. address" in FIG. 8) [block 800]. If the Internet Protocol-based communications address does not match an emergency Internet Protocol-based communications address [block 810], then the method stops [block 801]. However, if the Internet Protocol-based communications address does match an emergency Internet Protocol-based communications address [block 810], then the Emergency Communications Module activates the positioning system, retrieves location co-ordinates, and associates emergency data [block 820]. The Emergency Communications Module then transmits emergency communications to the communications switch [block 830]. The switch then detects and decodes emergency communications including location co-ordinates, a communications signal (data and/or voice), an emergency Internet Protocol-based communication address (referred to as "emergency IP comm. address" in FIG. 8), and associated emergency data [block 840]. If the emergency data is NOT remotely located [block 850] then the communications switch routes emergency communications to a data network (referred to as "DN" in FIG. 8) [block 870]. The data network then uses the location co-ordinates, the emergency Internet Protocol-based communications address, and/or emergency data to route emergency communications to an online emergency services provider [block 890]. The data network connects emergency communications to the online emergency services provider [block 895]. If the associated emergency data is remotely located [block 850], then the communications switch routes emergency communications with a request for associated emergency data to a telecommunications communications network and/or a remote database [block 860]. Then the associated emergency data is retrieved from the telecommunications network and/or the remote database [block 880]. The telecommunications network then routes emergency communications with associated emergency data to the data network or to the communications switch [block 885]. The data network uses the location coordinates, the emergency Internet Protocol-based communications address, and/or the emergency data to route emergency communications to the online emergency services provider [block 890]. The data network then connects emergency communications to the online emergency services provider [block 895].

The Emergency Communications Module (shown as reference numeral 110 in FIGS. 1-7) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mentioned here but considered within the scope of the present invention, allow the emergency communications module to be easily disseminated.

The Emergency Communications Module 110 may be physically embodied on or in any addressable (e.g., HTTP, I.E.E.E. 802.11, Wireless Application Protocol (WAP)) wireless device capable of presenting an IP address. Examples include a computer, a wireless personal digital assistant (PDA), an Internet Protocol phone, or a wireless pager.

While this invention has been described with respect to various features, aspects, and embodiments, those skilled and unskilled in the art will recognize this invention is not so limited. Other variations, modifications, and alternative embodiments may be made without departing from the spirit and scope of this invention.

What is claimed is:

1. A method, comprising:
   receiving a voice-over Internet protocol call to an outgoing Internet Protocol communications address;
   storing a database in memory of Internet Protocol emergency communications addresses of emergency service providers;
   querying the database for the outgoing Internet Protocol communications address;
   determining that the outgoing Internet Protocol communications address is an Internet Protocol emergency communications address by matching the outgoing Internet Protocol communications address to the database;
   retrieving a location coordinate representing a geographic location of a device associated with the voice-over Internet protocol call;
   mapping a location of a router in a network that is geographically closest to the location coordinate; and
   selecting an emergency response provider that is closest to the location of the router and that is registered by a governmental entity.

2. The method according to claim 1, further comprising activating a positioning system when the outgoing Internet Protocol communications address is the Internet Protocol emergency communications address.

3. The method according to claim 1, further comprising activating a positioning system to determine the location coordinate.

4. The method according to claim 3, wherein the positioning system comprises at least one of a global positioning system, an infrared system, a radio frequency system, or a target-based system.

5. The method according to claim 1, further comprising querying for the location coordinate.

6. The method according to claim 1, further comprising communicating an emergency signal.

7. The method according to claim 1, further comprising retrieving a profile from the memory.

8. A system, comprising:
   a processor executing code stored in memory that causes the processor to:
   receive a voice-over Internet protocol call to an outgoing Internet Protocol communications address;
   store a database of Internet Protocol emergency communications addresses of emergency service providers;
   query the database for the outgoing Internet Protocol communications address;
   determine that the outgoing Internet Protocol communications address is an Internet Protocol emergency communications address;
   retrieve a location coordinate representing a geographic location of a device associated with the voice-over Internet protocol call;
   map a location of a router in a network that is geographically closest to the location coordinate; and
   select an emergency response provider that is closest to the location of the router and that is registered by a governmental entity.

9. The system according to claim 8, wherein the code further causes the processor to determine if the outgoing Internet Protocol communications address is at least one of a publicly registered emergency response provider or an unregistered address.

10. The system according to claim 9, wherein the code further causes the processor to send an emergency communication to an address associated with the emergency response provider.

11. The system according to claim 9, wherein the code further causes the processor to activate a positioning system to determine the location coordinate.

12. The system according to claim 11, wherein the positioning system comprises at least one of a global positioning system, an infrared system, a radio frequency system, or a target-based system.

13. The system according to claim 9, wherein the code further causes the processor to query for the location coordinate.

14. The system according to claim 9, wherein the code further causes the processor to retrieve a profile from the memory.

15. A non-transitory computer readable medium storing processor executable instructions for performing a method, the method comprising:
   receiving a voice-over Internet protocol call to an outgoing Internet Protocol communications address;
   storing a database in memory of Internet Protocol emergency communications addresses of emergency service providers;
   querying the database for the outgoing Internet Protocol communications address;
   determining that the outgoing Internet Protocol communications address is an Internet Protocol emergency communications address;
   retrieving a location coordinate representing a geographic location of a device associated with the voice-over Internet protocol call;
   mapping a location of a router in a network that is geographically closest to the location coordinate; and selecting an emergency response provider that is closest to the location of the router and that is registered by a governmental entity.

16. The non-transitory computer readable medium according to claim 15, further comprising instructions for activating a positioning system when the outgoing Internet Protocol communications address is the Internet Protocol emergency communications address.

17. The non-transitory computer readable medium according to claim 15, further comprising instructions for activating a positioning system to determine the location coordinate.

18. The non-transitory computer readable medium according to claim 17, wherein the positioning system comprises at least one of a global positioning system, an infrared system, a radio frequency system, or a target-based system.

19. A method comprising:
receiving a voice-over Internet protocol call to an outgoing Internet Protocol-based communications address;
storing a database in memory of Internet Protocol emergency communications addresses of emergency service providers;
querying the database for the outgoing Internet Protocol-based communications address;
at least one processor determining that the outgoing Internet Protocol-based communications address is an Internet Protocol emergency communications address by matching the outgoing Internet Protocol-based communications address to the database;
selecting an emergency response provider (a) that services a geographic area matched with a location of a network component that is geographically closest to a device associated with the voice-over Internet protocol call and (b) that is registered by a governmental entity; and
prior to the selecting, retrieving a location coordinate representing a geographic location of said device, and mapping the location of the network component in a network to the location coordinate.

20. the method of claim 19 further comprising:
activating a positioning system to determine the location coordinate;
wherein the positioning system comprises at least one of a global positioning system, an infrared system, a radio frequency system, or a target-based system.

21. The method of claim 19 further comprising, prior to the selecting:
querying for the location coordinate.

22. The method of claim 19 further comprising:
retrieving a profile from the memory; and
wherein the profile comprises the Internet Protocol emergency communications address.

23. The method of claim 19 wherein:
the network component comprises a port.

24. The method of claim 23 wherein:
the port is a wireless port.

25. The method of claim 23 wherein:
the port is a wired port.

26. The method of claim 23 wherein:
the port is a parallel port.

27. The method of claim 23 wherein:
the port is a serial port.

28. The method of claim 23 wherein:
the port is an Ethernet port.

29. The method of claim 19 wherein:
the outgoing Internet Protocol-based communications address comprises a URL address.

30. The method of claim 19 wherein:
the outgoing Internet Protocol-based communications address comprises an email address.

31. The method of claim 19 wherein:
the outgoing Internet Protocol-based communications address comprises an IP address.

32. The method of claim 19 wherein:
the outgoing Internet Protocol-based communications address comprises a domain name.

33. The method of claim 19 further comprising:
automatically recognizing a character string to automatically formulate outgoing emergency IP-based communications.

34. A system comprising:
a processor executing code stored in memory that causes the processor to:
receive a voice-over Internet protocol call to an outgoing Internet Protocol-based communications address;
store a database in memory of Internet Protocol emergency communications addresses of emergency service providers;
query the database for the outgoing Internet Protocol-based communications address;
determine that the outgoing Internet Protocol-based communications address is an Internet Protocol emergency communications address by matching the outgoing Internet Protocol-based communications address to the database;
select an emergency response provider (a) that services a geographic area matched with a location of a network component that is geographically closest to a device associated with the voice-over Internet protocol call and (b) that is registered by a governmental entity; and
wherein the code further causes the processor, prior to selection of the emergency response provider, to retrieve a location coordinate representing a geographic location of said device and map the location of the network component in a network to the location coordinate.

35. The system of claim 34 wherein the code further causes the processor to:
activate a positioning system to determine the location coordinate;
wherein the positioning system comprises at least one of a global positioning system, an infrared system, a radio frequency system, or a target-based system.

36. The system of claim 34 wherein the code further causes the processor, prior to the selection of the emergency response provider, to:
query for the location coordinate.

37. The system of claim 34 wherein:
the code further causes the processor to retrieve a profile from the memory; and
the profile comprises the Internet Protocol emergency communications address.

38. The system of claim 34 wherein:
the network component comprises a port.

39. The system of claim 38 wherein:
the port is a wireless port.

40. The system of claim 38 wherein:
the port is a wired port.

41. The system of claim 38 wherein:
the port is a parallel port.

42. The system of claim 38 wherein:
the port is a serial port.

43. The system of claim 38 wherein:
the port is an Ethernet port.

44. The system of claim 34 wherein:
the outgoing Internet Protocol-based communications address comprises a URL address.

45. The system of claim 34 wherein:
the outgoing Internet Protocol-based communications address comprises an email address.

46. The system of claim 34 wherein:
the outgoing Internet Protocol-based communications address comprises an IP address.

47. The system of claim 34 wherein:
the outgoing Internet Protocol-based communications address comprises a domain name.

48. The system of claim 34 wherein the code further causes the processor to:
automatically recognize a character string to automatically formulate outgoing emergency IP-based communications.

49. A non-transitory computer readable medium comprising instructions to be executed by at least one processor to perform a method, the instructions comprising:
instructions to receive a voice-over Internet protocol call to an outgoing Internet Protocol-based communications address;
instructions to store a database in memory of Internet Protocol emergency communications addresses of emergency service providers;
instructions to query the database for the outgoing Internet Protocol-based communications address;
instructions to determine that the outgoing Internet Protocol-based communications address is an Internet Protocol emergency communications address by matching the outgoing Internet Protocol-based communications address to the database;
instructions to select an emergency response provider (a) that services a geographic area matched with a location of a network component that is geographically closest to a device associated with the voice-over Internet protocol call and (b) that is registered by a governmental entity; and
instructions to be executed prior to selection of the emergency response provider, to retrieve a location coordinate representing a geographic location of said device, and map the location of the network component in a network to the location coordinate.

50. The non-transitory computer readable medium of claim 49 further comprising instructions to:
activate a positioning system to determine the location coordinate;
wherein the positioning system comprises at least one of a global positioning system, an infrared system, a radio frequency system, or a target-based system.

51. The non-transitory computer readable medium of claim 49 further comprising instructions to be executed prior to selection of the emergency response provider, to:
query for the location coordinate.

52. The non-transitory computer readable medium of claim 49 further comprising instructions to:
retrieve a profile from the memory;
wherein the profile comprises the Internet Protocol emergency communications address.

53. The non-transitory computer readable medium of claim 49 wherein:
the network component comprises a port.

54. The non-transitory computer readable medium of claim 53 wherein:
the port is a wireless port.

55. The non-transitory computer readable medium of claim 53 wherein:
the port is a wired port.

56. The non-transitory computer readable medium of claim 53 wherein:
the port is a parallel port.

57. The non-transitory computer readable medium of claim 53 wherein:
the port is a serial port.

58. The non-transitory computer readable medium of claim 53 wherein:
the port is an Ethernet port.

59. The non-transitory computer readable medium of claim 49 wherein:
the outgoing Internet Protocol-based communications address comprises a URL address.

60. The non-transitory computer readable medium of claim 49 wherein:
the outgoing Internet Protocol-based communications address comprises an email address.

61. The non-transitory computer readable medium of claim 49 wherein:
the outgoing Internet Protocol-based communications address comprises an IP address.

62. The non-transitory computer readable medium of claim 49 wherein:
the outgoing Internet Protocol-based communications address comprises a domain name.

63. The non-transitory computer readable medium of claim 49 further comprising instructions to:
automatically recognize a character string to automatically formulate outgoing emergency IP-based communications.

* * * * *

UNITED STATES PATENT AND TRADEMARK OFFICE
CERTIFICATE OF CORRECTION

PATENT NO. : 8,537,821 B2  
APPLICATION NO. : 12/500668  
DATED : September 17, 2013  
INVENTOR(S) : Donald R. Laliberte Page 1 of 1

It is certified that error appears in the above-identified patent and that said Letters Patent is hereby corrected as shown below:

In the Claims

In column 17, line 40, claim 20, delete "the", and insert -- The --, therefor.

Signed and Sealed this  
Nineteenth Day of November, 2013

Teresa Stanek Rea  
*Deputy Director of the United States Patent and Trademark Office*